UNITED STATES PATENT OFFICE.

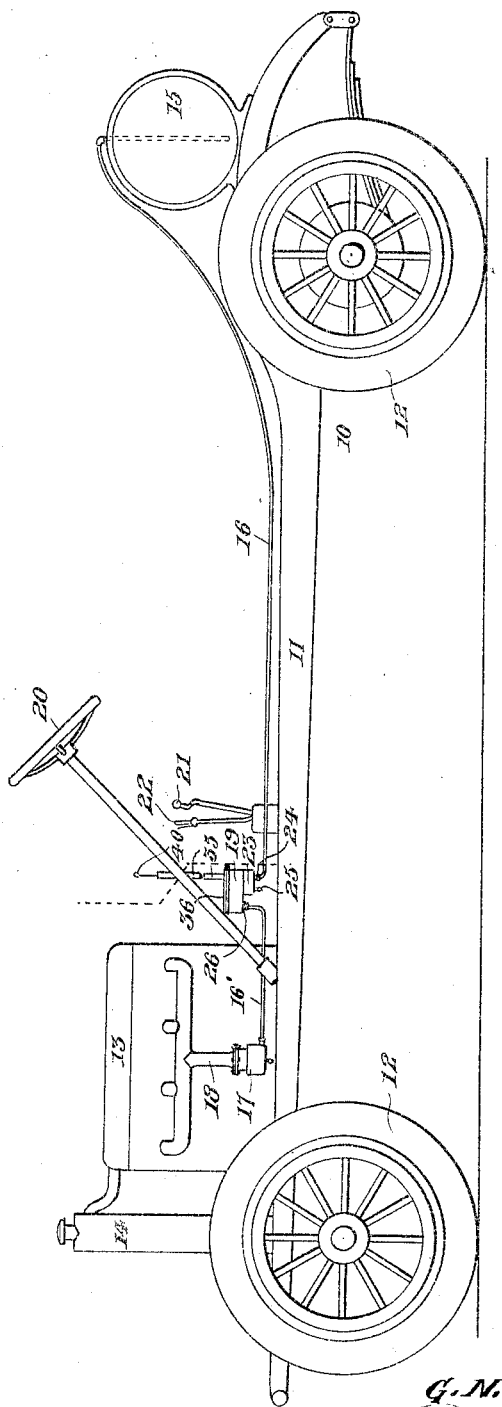

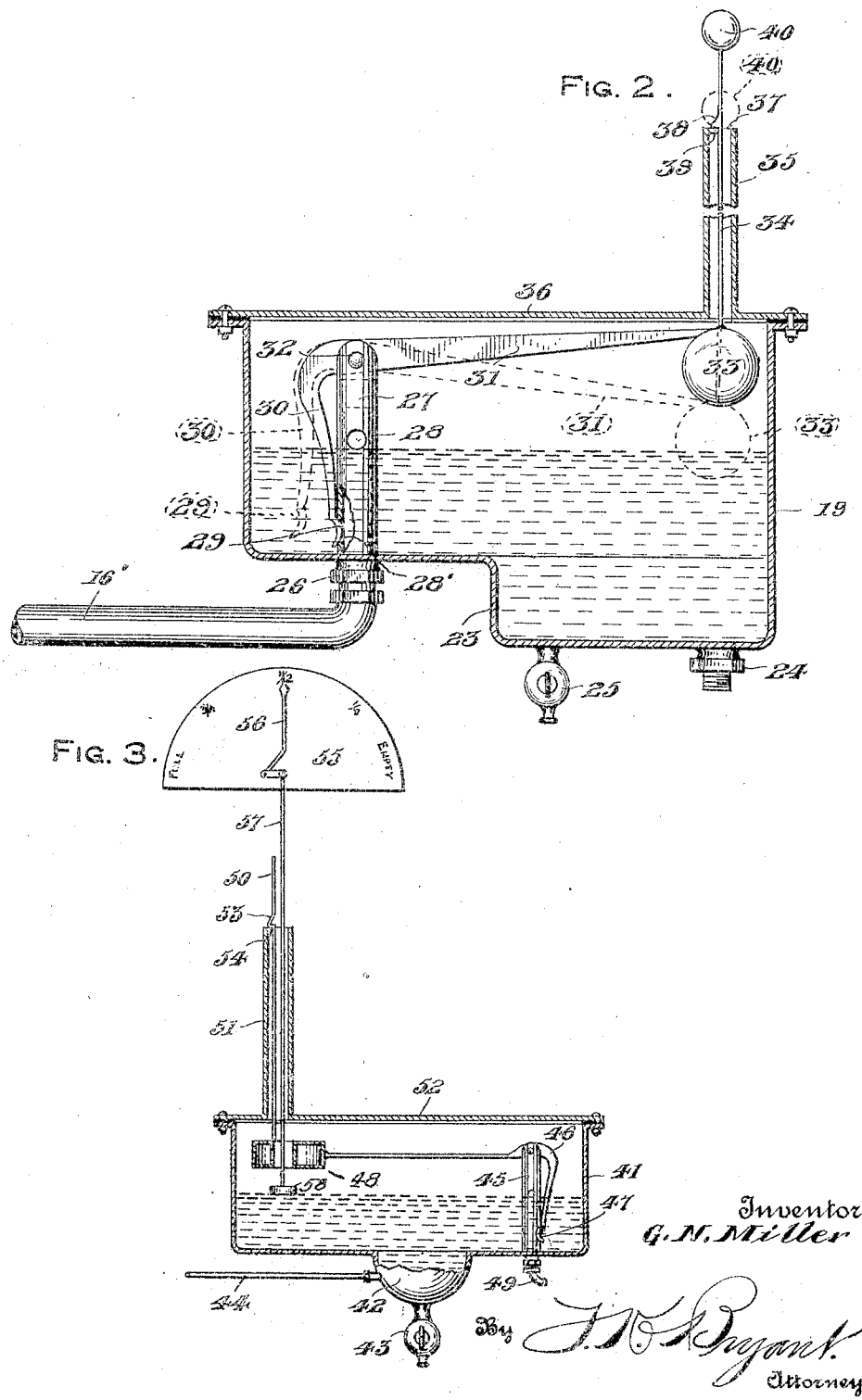

GEORGE N. MILLER, OF SOUTH BEND, INDIANA.

AUTOMATIC AUXILIARY FLUID-SUPPLY TANK.

1,325,649.  Specification of Letters Patent.  Patented Dec. 23, 1919.

Application filed March 4, 1919. Serial No. 280,575.

*To all whom it may concern:*

Be it known that I, GEORGE N. MILLER, a citizen of the United States of America, residing at South Bend, in the county of St. Joseph and State of Indiana, have invented certain new and useful Improvements in Automatic Auxiliary Fluid-Supply Tanks, of which the following is a specification.

The primary object of the invention is the provision of an auxiliary supply tank for fluid such as fuel gasolene for an explosive motor, in which a relatively small quantity of fluid is automatically trapped and stored for use only in case of an emergency as the occasion may arise.

A further object of the invention is the provision of an auxiliary gasolene tank for motor vehicles that is small in size and light in weight, the same being readily installed in the fuel supply line of a car without in any manner affecting the usual flow of explosive mixture from the tank to the carbureter.

The invention broadly contemplates an auxiliary gasolene storage tank positioned readily accessible from the driver's seat of an automobile, initial filling of the fuel tank of the vehicle serving to fill the auxiliary tank with fuel and operate a trapping device therein which permits the gasolene from the main tank to flow through the auxiliary tank unobstructed to the carbureter but retains the trapped gasolene in the auxiliary tank until the same is manually released by the driver of the vehicle.

With these general objects in view and others that will become apparent as the nature of the invention is better understood, the same consists in the novel form, construction, combination and arrangement of parts hereinafter more fully described, illustrated in the accompanying drawings, and pointed out in the appended claims.

In the drawings forming a part of this application and in which like designating characters refer to corresponding parts throughout the several views, Figure 1 is a side elevation of an automobile chassis illustrating my invention installed upon the gasolene pipe line thereof, Fig. 2 is a vertical longitudinal sectional view through the invention with the gasolene inlet pipe removed and the outlet pipe to the carbureter broken away and Fig. 3 is a further illustration of my invention in which a slightly modified form of auxiliary tank is employed with a fuel supply gage associated therewith.

Referring more in detail to the drawing, I have illustrated an automobile chassis 10 in Fig. 1 thereof, provided with a frame 11, wheels 12, motor 13, and radiator 14. The main supply tank 15 for the gasolene is conveniently positioned at any point thereon and may be of either the gravity feed or siphon feed type, the latter being herein illustrated. The pipe line for the gasolene consists of a tube 16 leading from the main tank 15 and adapted to supply gasolene to the carbureter 17 communicating with the interior of the motor 13 by means of the intake manifold 18 in the usual manner.

My improved automatic auxiliary tank consists of a relatively small receptacle or casing 19 preferably stamped out of pressed steel or formed of cast metal if desired and located at a point conveniently accessible by the driver of the vehicle when seated adjacent the steering wheel 20 and the clutch and brake levers 21 and 22 respectively.

My auxiliary tank 19 herein illustrated slightly in the rear of the motor 13 and conveniently positioned wherever desired has a depending drain basin or portion 23 into which the gasolene tube or pipe 16 communicates through any desired form of nipple or connection such as 24. A drain-off cock 25 is also provided for the basin 23 operable in the usual manner for withdrawing any sediment or contents of the basin 23 whenever desired.

A tube 16' leads from the outlet nipple 26 of the tank 19 to the carbureter 17, it being understood that the gasolene from the tank 15 normally passes to the carbureter 17 through the pipe line 16, 16' and freely passes through the casing 19 under normal running conditions.

A tubular post 27 within the tank 19 is mounted over the outlet nipple 26 for normally receiving the gasolene from the casing 19 through an upper opening 28 in the post for flowing downwardly through the post and outlet 26 into the pipe 16'.

A lower opening or port 28' is provided in the post 27 normally closed by means of a valve 29 upon the depending arm 30 of a rocker 31 pivoted by means of a pin 32 in the top of the post 27.

A float 33 upon the longer arm of the rocker 31 is adapted to be elevated by the incoming gasolene when the auxiliary tank 19 is being filled, this elevating of the float 33 bringing the valve 29 in its closing position over the outlet port 28'. A resilient rod 34 mounted upon the float 33 projects upwardly through a tube 35 upon the top 36 of the casing 19, the said rod projecting through a slot 37 in the upper end of the tube and provided with a side lug 38 for fitting over the side of the tube or a side lip 39 thereof for maintaining the rod 34 projected and the float 33 elevated when the level of the gasolene within the casing 19 becomes lowered.

The casing 19 will remain normally filled with gasolene passing therethrough between the pipes 16 and 16' but upon the emptying of the main tank 15, the inflowing supply from the pipe 16 will cease so that the gasolene in the casing 19 will lower to a point just below the port 28 as illustrated in Fig. 2 of the drawings. No further gasolene will then be supplied to the carbureter 17 until the operator forcibly removes the lug 38 from the lip 39, permitting the rod 34 and float 33 to lower thereby swinging the valve 29 off of the outlet port 28' so that the supply of gasolene within the auxiliary tank is then permitted to pass to the carbureter 17 through the pipe 16'. A ball 40 or similar member is preferably provided upon the upper end of the rod 34 for convenience in grasping in disconnecting the lug 38. Upon refilling the auxiliary tank 19, it will be understood that the rising of the gasolene again automatically elevates the float 33 and closes the port 28' while the resiliency of the rod 34 permits the lug 38 to snap over the lip 39, retaining the elements in their said positions as heretofore set forth.

The auxiliary tank 19 may have the tube 35 thereof extending above the level of the top of the main tank 15 if desired and while the form of the invention herein set forth and described is believed to be preferable, it will nevertheless be understood that minor changes may be made in the form, proportion and detail of parts if found desirable without departing from the spirit and scope of my invention as claimed.

In Fig. 3 of the drawings, I have illustrated an auxiliary tank 41 having a basin 42 provided with an outlet nipple 43 and a gasolene inlet pipe 44. The tubular post 45 has a rocking lever 46 for normally closing a port 47 adjacent the bottom of the device by means of a float 48 carried by said lever and operated by the rise of gasolene within the tank. The outlet pipe 49 communicates with the interior of the post 45 while a rod 50 upon the float 48 extends through a tube 51 upon the top 52 of the casing 41 and has a lug 53 adapted for automatically engaging over a side lip 54 at the top of the tube 51 when the float 48 is elevated by the fluid.

A dial 55 may be provided at a convenient point adjacent the tank 41 having its indicating finger 56 operatively connected with a rod 57 which extends through the tube 51 to a float 58 at all times resting upon the surface of the gasolene in the tank 41 and whereby the quantity of gasolene therein is readily ascertained by viewing the dial 55.

A serviceable auxiliary tank is provided which will supply a sufficient amount of gasolene to permit the vehicle to travel a predetermined distance after the main gasolene tank has been emptied. The device may be readily installed upon the pipe line of any explosive motor by only slight expense while it will also be understood that the invention may be serviceable in other connections where a supply of fluid is desirable for meeting an emergency but without in any manner effecting the usual free operation of the pipe line employed.

What I claim as new is:—

1. A fluid auxiliary tank comprising a casing having an inlet and an outlet, a conduit communicating with the casing communicating with the outlet thereof and provided with ports at different elevations, means adapted for automatically closing one of said ports during the filling of the casing with fluid, automatically operable retaining means attached to said port-closing means adapted for actuation upon the closing of the port, and manual releasing means for the retaining means.

2. An auxiliary fluid supply member comprising a casing having a fluid inlet and a fluid outlet, a tubular member within the casing communicating with said outlet and having upper and lower ports, float-operated means within the casing adapted for closing the lower port when the level of fluid within the casing is above the lower port, and automatic retaining means for the said float-operated means when the latter is in its operative closed position, the retaining means being adapted for manual release for opening the lower port when the level of the fluid within the casing falls below the upper port.

3. An auxiliary supply tank for fluid comprising a casing having inlet and outlet nipples, a tubular post within the casing communicating with the outlet nipple and having an upper and a lower port therein, a rocker pivoted within the casing having a valve adapted for opening and closing the lower port, a float attached to the rocker adapted for shifting the latter with the valve closing the lower port when entering fluid substantially fills the said casing, and retaining means for the rocker extending exteriorly of the casing.

4. An auxiliary supply tank for fluid comprising a casing having inlet and outlet nipples, a tubular post within the casing communicating with the outlet nipple and having an upper and a lower port therein, a rocker pivoted within the casing having a valve adapted for opening and closing the lower port, a float attached to the rocker adapted for shifting the latter with the valve closing the lower port when entering fluid substantially fills the said casing, a rod carried by the float extending exteriorly of the casing, a lug upon the rod, and means carried by the casing adapted for automatical engagement by the lug for retaining the rod and float elevated when the valve is closing said lower port.

5. An auxiliary supply tank for fluid comprising a casing having inlet and outlet nipples, a tubular post within the casing communicating with the outlet nipple and having an upper and a lower port therein, a rocker pivoted within the casing having a valve adapted for opening and closing the lower port, a float attached to the rocker adapted for shifting the latter with the valve closing the lower port when entering fluid substantially fills the said casing, a tube upon the top of the casing, a resilient rod upon the float extending through said tube and outwardly of the upper end thereof, a lug upon said rod adapted for automatically engaging over the upper portion of the tube when the float is elevated with the valve in its closed position, and a hand-engaging member upon the upper end of the rod adapted for releasing the rod and permitting the lowering of the float and the opening of said lower port.

In testimony whereof I affix my signature.

GEORGE N. MILLER.